US010129850B2

(12) United States Patent
Takahashi et al.

(10) Patent No.: US 10,129,850 B2
(45) Date of Patent: Nov. 13, 2018

(54) PAGING CONTROL METHOD, COMMUNICATION CONTROL APPARATUS AND BASE STATION

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/524,348

(22) PCT Filed: Jan. 21, 2016

(86) PCT No.: PCT/JP2016/051725
§ 371 (c)(1),
(2) Date: May 4, 2017

(87) PCT Pub. No.: WO2016/117653
PCT Pub. Date: Jul. 28, 2016

(65) Prior Publication Data
US 2017/0332348 A1    Nov. 16, 2017

(30) Foreign Application Priority Data

Jan. 22, 2015  (JP) ................................ 2015-010451

(51) Int. Cl.
*H04W 68/00* (2009.01)
*H04W 68/02* (2009.01)
(Continued)

(52) U.S. Cl.
CPC ........... *H04W 68/02* (2013.01); *H04W 28/14* (2013.01); *H04W 68/04* (2013.01); *H04W 76/20* (2018.02); *H04W 88/08* (2013.01)

(58) Field of Classification Search
CPC ...... H04W 68/02; H04W 68/04; H04W 88/08
(Continued)

(56) References Cited

U.S. PATENT DOCUMENTS 6,546,255 B1    4/2003  Cerwall et al.
9,635,702 B2 *  4/2017  Miklos .................. H04W 76/38
(Continued)

FOREIGN PATENT DOCUMENTS

| EP | 2557890 A1 | 2/2013 |
| JP | 2002-533037 A | 10/2002 |
| WO | 2013144606 A1 | 10/2013 |

OTHER PUBLICATIONS

International Search Report issued in PCT/JP2016/051725 dated Mar. 8, 2016 (5 pages).

(Continued)

*Primary Examiner* — Amancio Gonzalez
(74) *Attorney, Agent, or Firm* — Osha Liang LLP

(57) ABSTRACT

A paging control method in a mobile communication system including a base station and a communication control apparatus, including: an instruction step in which, in a state where a connection between the base station and the communication control apparatus is established, the base station transmits a connection maintaining instruction signal to the communication control apparatus; and a paging step in which, when the communication control apparatus that receives the connection maintaining instruction signal receives downlink data for the user apparatus, the communication control apparatus holds the downlink data in a buffer and transmits a paging signal for the user apparatus while maintaining the connection between the base station and the communication control apparatus.

9 Claims, 15 Drawing Sheets

(51) Int. Cl.
  H04W 76/20 (2018.01)
  H04W 28/14 (2009.01)
  H04W 68/04 (2009.01)
  H04W 88/08 (2009.01)
(58) Field of Classification Search
  USPC .......................................................... 455/458
  See application file for complete search history.

(56) References Cited

U.S. PATENT DOCUMENTS

| | | | |
|---|---|---|---|
| 2005/0003836 A1* | 1/2005 | Inoue | H04W 68/00 |
| | | | 455/458 |
| 2011/0044210 A1* | 2/2011 | Yokota | H04W 76/02 |
| | | | 370/259 |
| 2013/0039287 A1 | 2/2013 | Rayavarapu et al. | |
| 2016/0234877 A1* | 8/2016 | Bangolae | H04W 76/046 |
| 2017/0245318 A1 | 8/2017 | Rayavarapu et al. | |

OTHER PUBLICATIONS

Written Opinion of the International Searching Authority issued in PCT/JP2016/051725 dated Mar. 8, 2016 (5 pages).
3GPP TS 36.413 V12.4.0; "3rd Generation Partnership Project; Technical Specification Group Radio Access Network; Evolved Universal Terrestrial Radio Access Network (E-UTRAN); S1 Application Protocol (S1AP)(Release 12)"; Dec. 2014 (300 pages).
3GPP TSG-RAN Meeting #66; RP-142030; Ericsson; "New Wid proposal: Signalling Reduction for Idle-Active Transitions in LTE Discussion and Approval"; Maui, USA; Dec. 8-11, 2014 (5 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)"; Dec. 2014 (251 pages).
3GPP TS 23.401 V12.7.0; "3rd Generation Partnership Project; Technical Specification Group Services and System Aspects; General Packet Radio Service (GPRS) enhancements for Evolved Universal Terrestrial Radio Access Network (E-UTRAN) access (Release 12)"; Dec. 2014 (308 pages).
3GPP TSG SA WG2 Meeting #106; S2-144079; LG Electronics, LG Uplus; "Further Clarification on downlink data delivery failure due to inter-MME/SGSN mobility"; San Francisco, California, USA; Nov. 17-21, 2014 (7 pages).
3GPP TSG-RAN #66; RP-142033; Ericsson; Motivation for New proposed WI; "Signalling Reduction for Idle-Active Transitions in LTE"; Dec. 2, 2014 (8 pages).
3GPP TS 23.401 V13.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 13)"; Dec. 2014 (310 pages).
Extended European Search Report issued in the counterpart European Patent Application No. 16740260.1, dated Jan. 3, 2018 (7 pages).

* cited by examiner

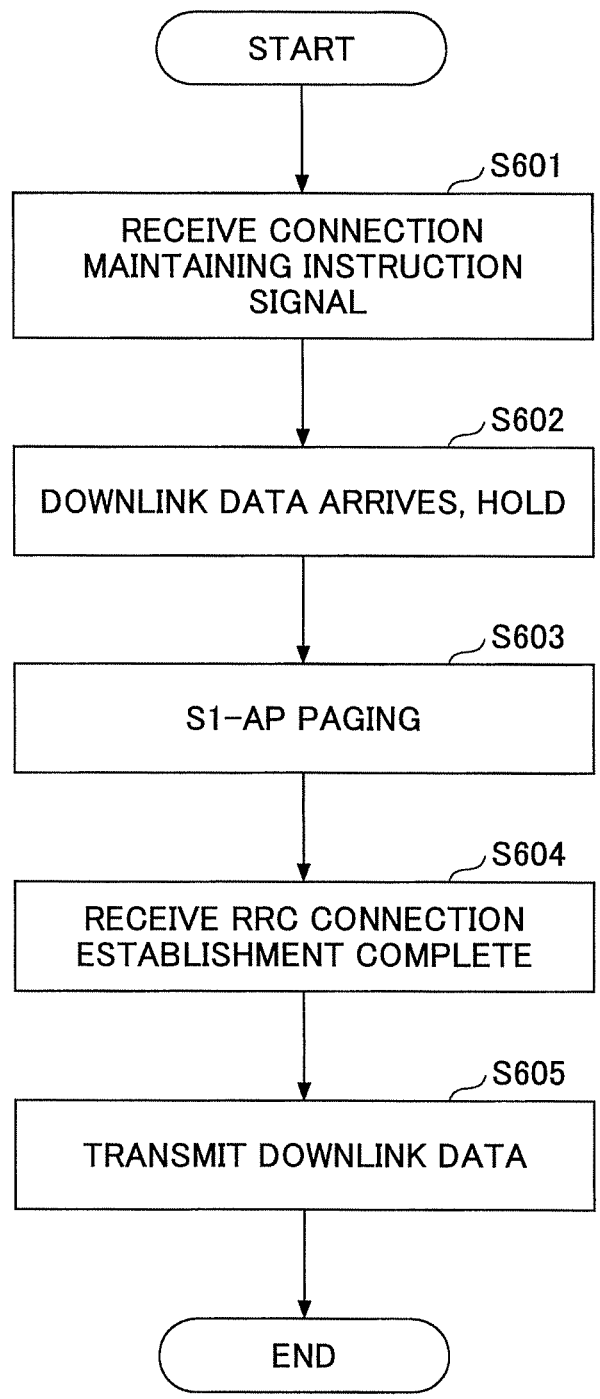

US 10,129,850 B2

PAGING CONTROL METHOD, COMMUNICATION CONTROL APPARATUS AND BASE STATION

TECHNICAL FIELD

The present invention relates to a mobile communication system that transmits, to a user apparatus UE that performs state transition between an idle state and a connected state, a paging signal informing the user apparatus UE of call incoming.

BACKGROUND ART

In an LTE system, connection states between a user apparatus UE (to be referred to as UE hereinafter) and a base station eNB (to be referred to as eNB hereinafter) are indicated by two states of an RRC (Radio Resource Control) idle state (RRC_Idle) and an RRC connected state (RRC_Connected).

When a UE connects to a network, a UE context is generated by an MME (Mobility Management Entity) in a core network (core NW) side, so that the UE context is held by an eNB that the UE is connected to and by the UE. Note that the UE context is information including bearer related information and security related information and the like.

When the UE transits between the RRC idle state and the RRC connected state, a lot of signaling of call control including the core NW side occurs. Thus, how signaling can be decreased is a problem.

For example, when a UE is caused to transit from an RRC connected state to an RRC idle state, signaling shown in FIG. 1 occurs (non-patent document 1 and the like). The case shown in FIG. 1 is a case where an eNB 2 detects that communication of a UE 1 does not occur for a predetermined time, and disconnects connection with the UE 1 to cause the UE 1 to transit to an RRC idle state.

In FIG. 1, the eNB 2 transmits a UE context release request (UE Context Release Request) to an MME 3 (step 1). The MME 3 transmits a bearer release request (Release Access Bearers Request) to an S-GW 4 (step 2), and the S-GW 4 returns a bearer release response (Release Access Bearers Response) to the MME 3 (step 3).

The MME 3 transmits a UE context release instruction (UE Context Release Command) to the eNB (step 4). The eNB 2 transmits an RRC connection release (RRC Connection Release) to the UE 1 (step 5) to cause the UE 1 to transit to an RRC idle state. Also, the eNB 2 releases the UE context and transmits a UE context release complete (UE Context Release Complete) to the MME 3 (step 6).

RELATED ART DOCUMENT

Non Patent Document

[NON PATENT DOCUMENT 1] 3GPP TS 36.413 V12.4.0 (2014-12)
[NON PATENT DOCUMENT 2] 3GPP TSG RAN Meeting #66 RP-142030 Maui, USA, 8-11 Dec. 2014

SUMMARY OF THE INVENTION

Problem to be Solved by the Invention

In order to decrease signaling when a UE transits between an RRC idle state and an RRC connected state, a method starts to be studied in which, when the UE performs transition of RRC connected state→RRC idle state→RRC connected state within a same eNB, the eNB continues to hold the UE context so as to reuse it (non-patent document 2). An example of a procedure that can be considered in the method is described with reference to FIG. 2.

In the state shown in (a) of FIG. 2, the UE 1 is in an RRC connected state, in which an S1-C connection and an S1-U connection (shown as S1-C/U in the figure) related to the UE 1 are established in the core NW side. Note that the S1-C connection is an S1 connection for transmitting a C-plane signal, and the S1-U connection is an S1 connection for carrying U-plane.

The state of the UE 1 changes from the state shown in (a) to an RRC idle state by RRC connection release (RRC Connection Release) as shown in (b) and (c). At this time, the UE context for the UE 1 in the eNB 2 remains held, and also the S1-C/U connection for the UE 1 remains kept. Then, as shown in (d), when the UE 1 transits to the RRC connected state, the eNB 2 notifies the UE 1 of the holding UE context by an RRC connection establishment signal. Accordingly, by reusing the UE context, signaling can be reduced.

However, in the above-mentioned method in which the eNB continues to hold the UE context even when the UE enters an RRC idle state, there is a problem in that, if the UE moves, while in an idle state, from an area of an eNB that holds the UE context to an area of another eNB, the UE cannot receive an incoming call.

That is, as shown in FIG. 3, in a state where an eNB-A holds a UE context and an S1-C/U connection is maintained between the eNB-A and the core NW, it is assumed that the UE in an idle state moves to an area of an eNB-B which is another eNB, and after that, there is an incoming call to the UE.

In this case, since the S1-C/U connection remains kept, downlink data for the UE reaches the eNB-A. After that, control can be considered to be performed in which the eNB-A transmits paging in a cell of the eNB-A itself. However, since the UE has moved to the another eNB-B area, the UE cannot receive the paging from the eNB-A. In the above-mentioned case, it can be also considered to perform paging from the MME in the same way as the conventional technique. However, in the conventional technique, there is no mechanism to perform incoming control by a paging from the MME to the UE in an idle state while the S1-C/U connection remains established. In order to perform paging from the MME, it can be considered to perform the paging by an existing method after once performing UE context release and S1-C/U connection release in the eNB-A. However, in such a case, the number of signalings cannot be reduced.

The present invention is contrived in view of the above-mentioned point, and an object of the present invention is to provide a technique, in a mobile communication system including a base station and a communication control apparatus, to make it possible to properly perform call incoming for a user apparatus while reducing the number of signalings.

Means for Solving the Problem

According to an embodiment of the present invention, there is provided a paging control method in a mobile communication system including a base station and a communication control apparatus, including:

an instruction step in which, in a state where a connection between the base station and the communication control apparatus is established, the base station transmits a connection maintaining instruction signal to the communication control apparatus; and a paging step in which, when the communication control apparatus that receives the connection maintaining instruction signal receives downlink data for the user apparatus, the communication control apparatus holds the downlink data in a buffer and transmits a paging signal for the user apparatus while maintaining the connection between the base station and the communication control apparatus.

Also, according to an embodiment of the present invention, there is provided a paging control method in a mobile communication system including a base station and a communication control apparatus, including:

a first paging step in which, in a state in which a connection between the base station and the communication control apparatus is established, when the base station receives downlink data for a user apparatus from the communication control apparatus, the base station transmits a paging signal for the user apparatus; and a request step in which, when the base station detects that there is no response for the paging signal from the user apparatus, the base station requests the communication control apparatus to transmit a paging signal for the user apparatus.

Also, according to an embodiment of the present invention, there is provided a communication control apparatus in a mobile communication system including a base station and a communication control apparatus, including:

reception means configured, in a state where a connection between the base station and the communication control apparatus is established, to receive a connection maintaining instruction signal from the base station; and control means configured, when receiving downlink data for a user apparatus after receiving the connection maintaining instruction signal, to hold the downlink data in a buffer and transmit a paging signal to the user apparatus while maintaining the connection between the base station and the communication control apparatus.

Also, according to an embodiment of the present invention, there is provided a base station in a mobile communication system including the base station and a communication control apparatus, including:

transmission means configured, in a state in which a connection between the base station and the communication control apparatus is established, to transmit a paging signal for a user apparatus when receiving downlink data for the user apparatus from the communication control apparatus; and control means configured, when detecting that there is no response for the paging signal from the user apparatus, to request the communication control apparatus to transmit a paging signal for the user apparatus.

Effect of the Present Invention

According to an embodiment of the present invention, there is provide a technique, in a mobile communication system including a base station and a communication control apparatus, to make it possible to properly perform call incoming for a user apparatus while reducing the number of signalings.

BRIEF DESCRIPTION OF THE DRAWINGS

FIG. 15 is a flowchart indicating an operation example of the MME•S-GW.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, the present embodiment is intended for a system of LTE. However, the present invention can be applied not only to LTE.

In the specification and the claims, the term of "LTE" is not limited to a specific release unless otherwise specified.

(System Whole Configuration)

Figure 1:
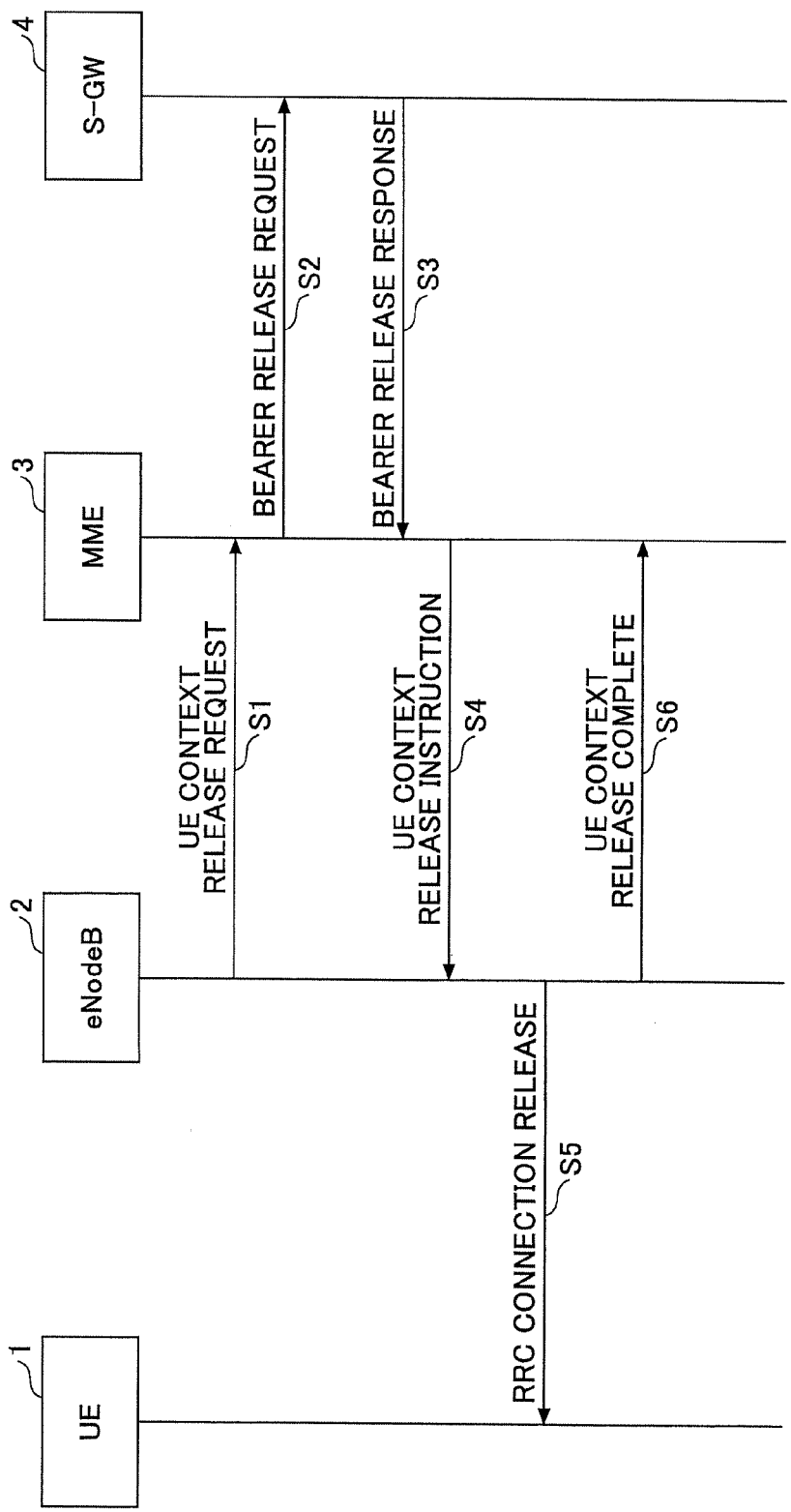
FIG. 1 is a diagram showing a signaling sequence example when transiting to an RRC idle state.
Figure 2:
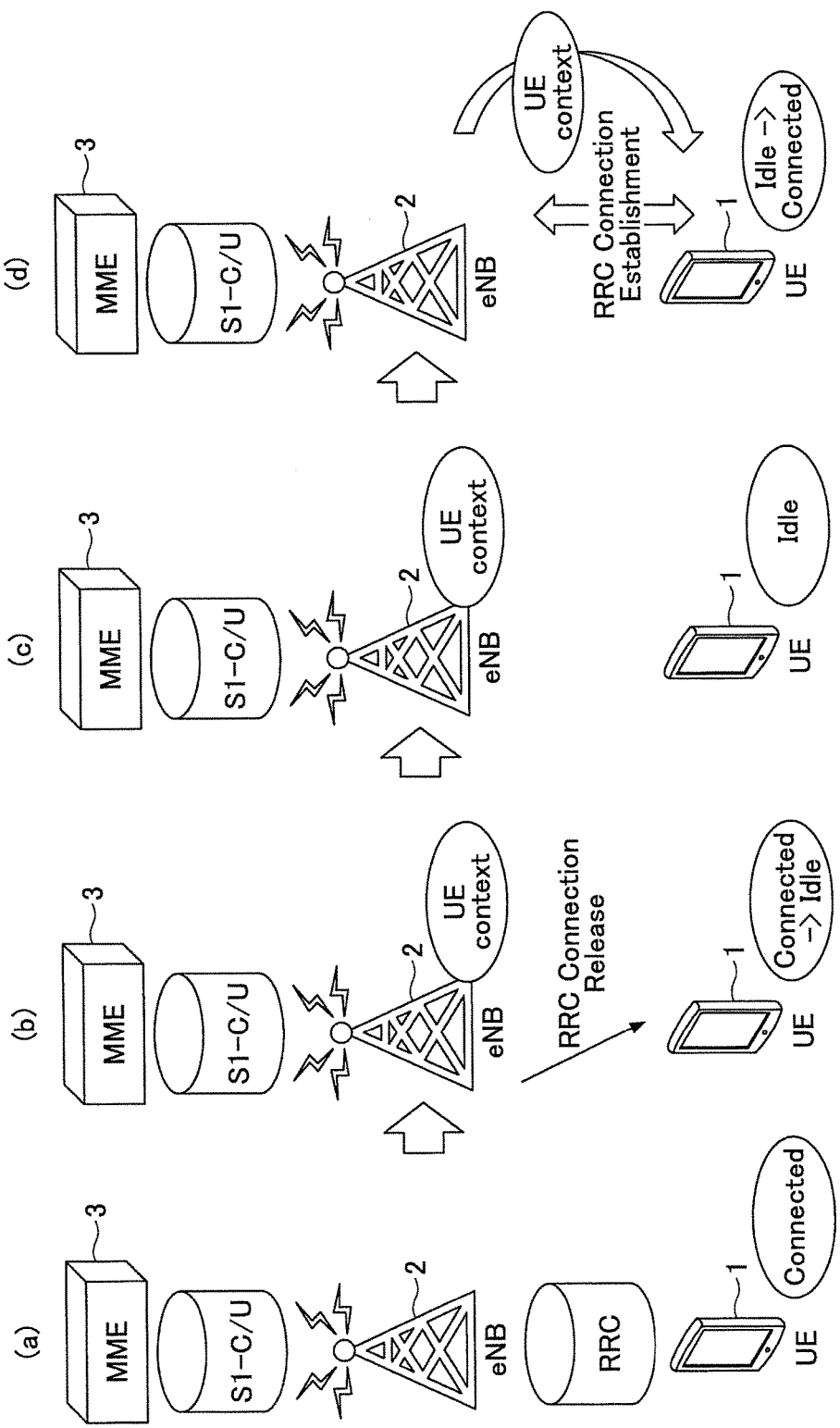
FIG. 2 is a diagram for explaining a problem.
Figure 3:
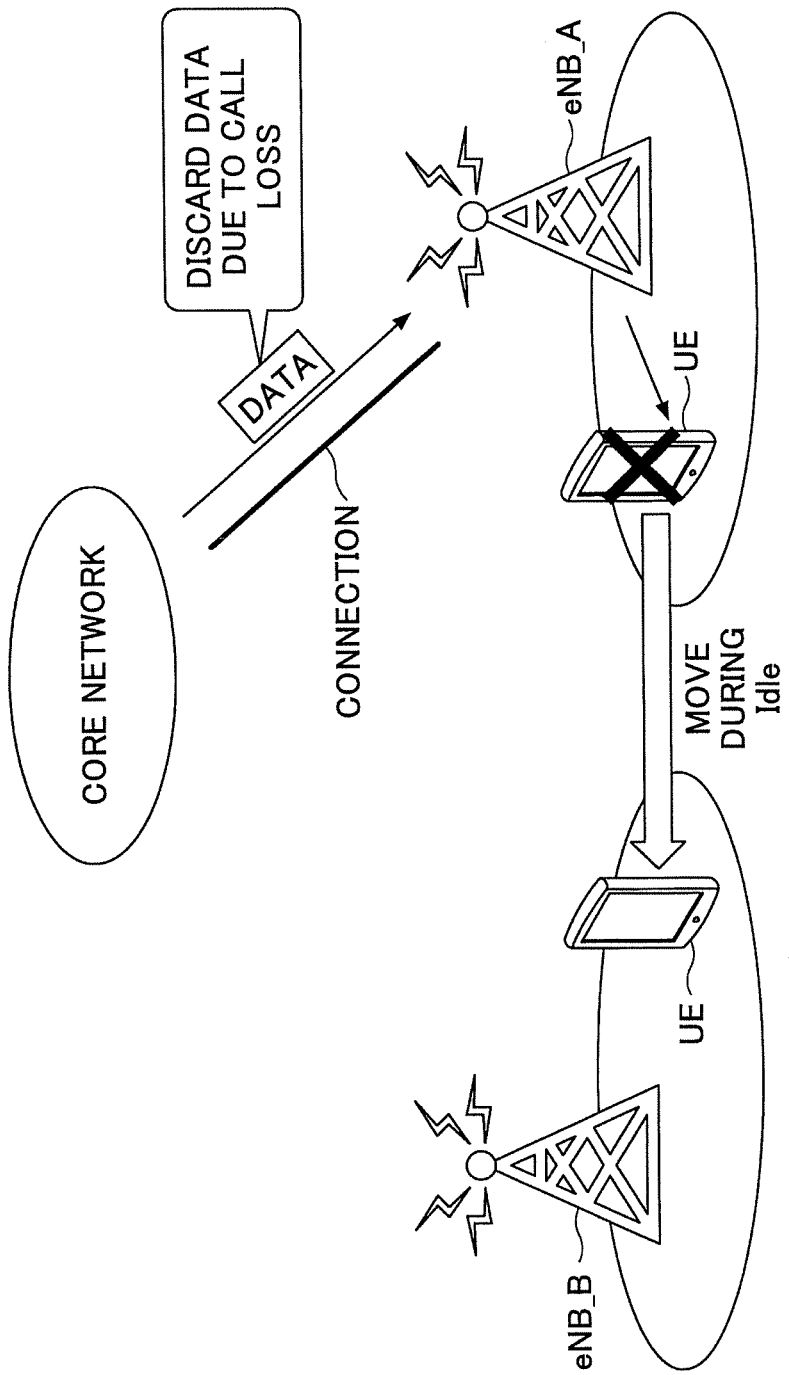
FIG. 3 is a diagram for explaining a problem.
Figure 4:
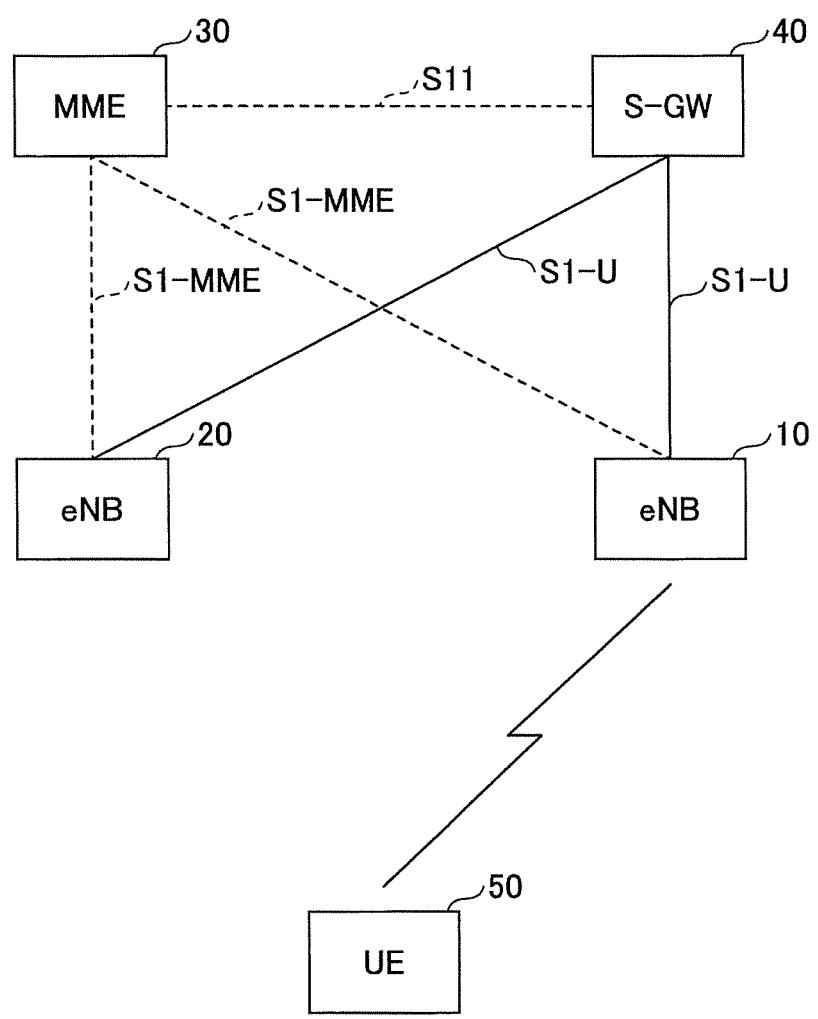
FIG. 4 is a block diagram of a communication system according to an embodiment of the present invention.

FIG. 4 is a diagram showing a configuration example of a communication system in an embodiment of the present invention. As shown in FIG. 4, the communication system of the present embodiment includes an eNB 10, an eNB 20, an MME 30, an S-GW (Serving Gateway) 40 and a UE 50. Note that FIG. 4 only shows parts related to the present invention in terms of the core network (EPC).

The UE 50 is a user apparatus such as a mobile telephone and the like. Each of the eNB 10 and eNB 20 is a base station. The MME 30 is a node apparatus that accommodates the eNBs, and performs mobility management such as position registration, paging, handover and the like, and bearer establishment/deletion and the like. The S-GW 40 is a node apparatus that performs relaying of user data (U-Plane data). A system including the MME 30 and the S-GW 40 is called a communication control apparatus. Also, the MME 30 and the S-GW 40 may be implemented as one apparatus, and the apparatus may be called a communication control apparatus.

As shown in FIG. 4, the MME 30 and the eNBs 10, 20 are connected by an S1-MME interface, and the S-GW 40 and the eNBs 10, 20 are connected by an S1-U interface. A connection line of a dotted line shows a control signal interface, and a connection line of a solid line indicates an interface of user data transfer.

The present embodiment presupposes the scheme, described before, in which, even when the UE 50 transits from an RRC connected state to an RRC idle state in the same eNB, a UE context of the UE 50 is held in the eNB, and an S1-C/U connection for the UE 50 is maintained. As described before, this scheme is a scheme to make it possible to reduce the number of signalings.

In the following, as techniques to enable the UE 50 to properly receive an incoming call even when the UE 50 that has transited to an RRC idle state moves from an area of the eNB 10 that holds the UE context to an area of another eNB 20, a first embodiment and a second embodiment are described.

First Embodiment

First, a first embodiment is described. In the first embodiment, a scheme is described in which paging is performed from the MME 30 when there is an incoming call for the UE 50 that is in an RRC idle state.

<Call Incoming when Residing in a Same eNB>

A process sequence is described with reference to FIG. 5 in a case where the UE 50 connects to the eNB 10 to enter an RRC connected state, then becomes in an RRC idle state in a cell under the eNB 10, and after that, receives an incoming call.

Figure 5:
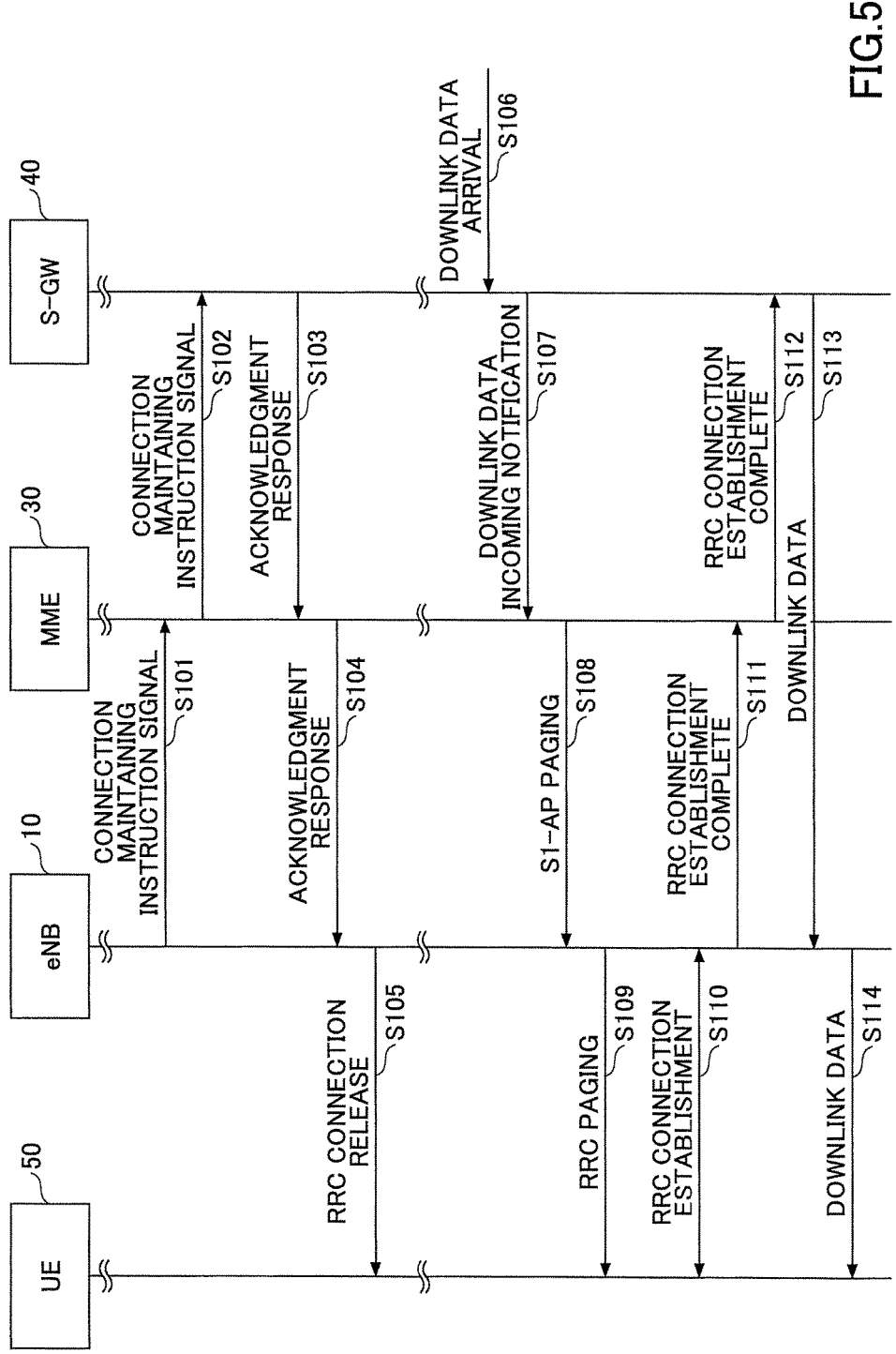
FIG. 5 is a diagram showing a sequence example in a first embodiment.

As a premise of the processes of FIG. 5, it is assumed that the UE 50 is in an RRC connected state in a cell of the eNB 10, and the S1-C/U connection on the UE 50 is established. In FIG. 5, the S1-C connection includes a connection between the eNB 10 and the MME 30 and a connection between the MME 30 and the S-GW 40, and the S1-U connection includes a connection between the eNB 10 and the S-GW 40. When a connection has been established, a signal (data) related to the UE 50 can be transmitted and received between the node apparatuses without performing a procedure for connection setup such as connection establishment signals and the like.

Before describing the procedure of FIG. 5, an outline of an example of a procedure when the UE 50 initially connects to the eNB 10 is described. In random access of the UE 50, the eNB 10 transmits an RRC Connection Setup to the UE 50 to have the UE 50 be in an RRC connected state, and receives an RRC Connection Setup Complete from the UE 50. After that, the eNB 10 receives an Initial Context Setup Request from the MME 30, transmits an RRC Connection Reconfiguration to the UE 50, receives an RRC Connection Reconfiguration Complete from the UE 50, and transmits an Initial Context Setup Response to the MME 30. Through such a procedure, holding of the UE context, connection establishment of S1-C/U and the like are performed.

As shown in FIG. 5, in an RRC connected state, the eNB 10 transmits a connection maintaining instruction signal to the MME 30 (step 101). Also, the MME 30 transmits the connection maintaining instruction signal to the S-GW 40 (step 102).

The connection maintaining instruction signal is a signal for instructing to hold downlink data in the S-GW 40 and to perform paging from the MME 30 when there is an incoming call for the UE 50 while maintaining the S1-C/U connection on the UE 50.

The S-GW 40 that receives the connection maintaining instruction signal transmits, to the MME 30, an acknowledgement response indicating that the instruction is confirmed (step 103), so that the MME 30 transmits the acknowledgment response to the eNB 10 (step 104).

Transmission of the connection maintaining instruction signal from the eNB 10 to the MME 30 on the UE 50 may be performed when an event that causes the UE 50 to transit to an RRC idle state occurs as a trigger, or may be performed right after the S1-C/U connection on the UE 50 is established when the UE 50 initially enters in an RRC connected state under the eNB 10.

The above-mentioned event that causes the UE 50 to transit to an RRC idle state is, for example, a case where the eNB 10 detects that communication (uplink and downlink user data communication) with the UE 50 does not occur for a predetermined time based on expiration of a predetermined timer (example: UE Inactivity Timer), but, not limited to this.

FIG. 5 assumes the case of using, as the trigger, detection of non-occurrence of communication (uplink and downlink user data communication) with the UE 50 for a predetermined time, in which, after steps 101~104, the eNB 10 transmits an RRC Connection Release (RRC Connection Release) to the UE 50 to cause the UE 50 to transit to an RRC idle state (step 105).

After that, downlink data for the UE 50 occurs, and the downlink data arrives at the S-GW 40 (step 106). Here, although the S1-U connection has been established, the S-GW 40 holds the downlink data in a buffer without transferring the downlink data to the eNB 10 based on the connection maintaining instruction signal received in step 102.

The S-GW 40 transmits a downlink data incoming notification to the MME 30 (step 107), and the MME 30 transmits, to the eNB 10, a signal of S1-AP paging for the UE 50 (step 108). The paging itself is similar to existing paging. Thus, it is transmitted to each eNB of tracking areas of the UE 50, but FIG. 5 shows transmission to the eNB 10.

The eNB 10 that receives the signal of S1-AP paging transmits a signal of RRC paging to the UE 50 under the eNB 10 (step 109).

The UE 50 that receives the RRC paging signal executes an RRC connection establishment procedure, and after an RRC connection is established (step 110), the eNB 10 transmits, to the MME 30, an RRC connection establishment complete that is a signal indicating that establishment of an RRC connection has completed (step 111). Note that, the eNB 10 can determine that RRC connection with the UE 50 has been established by receiving an RC Connection Setup Complete from the UE 50, for example. However, this is an example, and the determination may be made based on another signal.

The MME 30 transmits a signal of RRC connection establishment complete to the S-GW 40 (step 112). Accordingly, the S-GW 40 determines that an RRC connection between the UE 50 and the eNB 10 has been established so as to start transfer of the holding downlink data to the eNB 10 using the already established S1-U connection related to the UE 50 (step 113). The downlink data arrives at the UE 50 from the eNB 10 (step 114). Accordingly, transmission of downlink data to the UE 50 starts.

Figure 6:
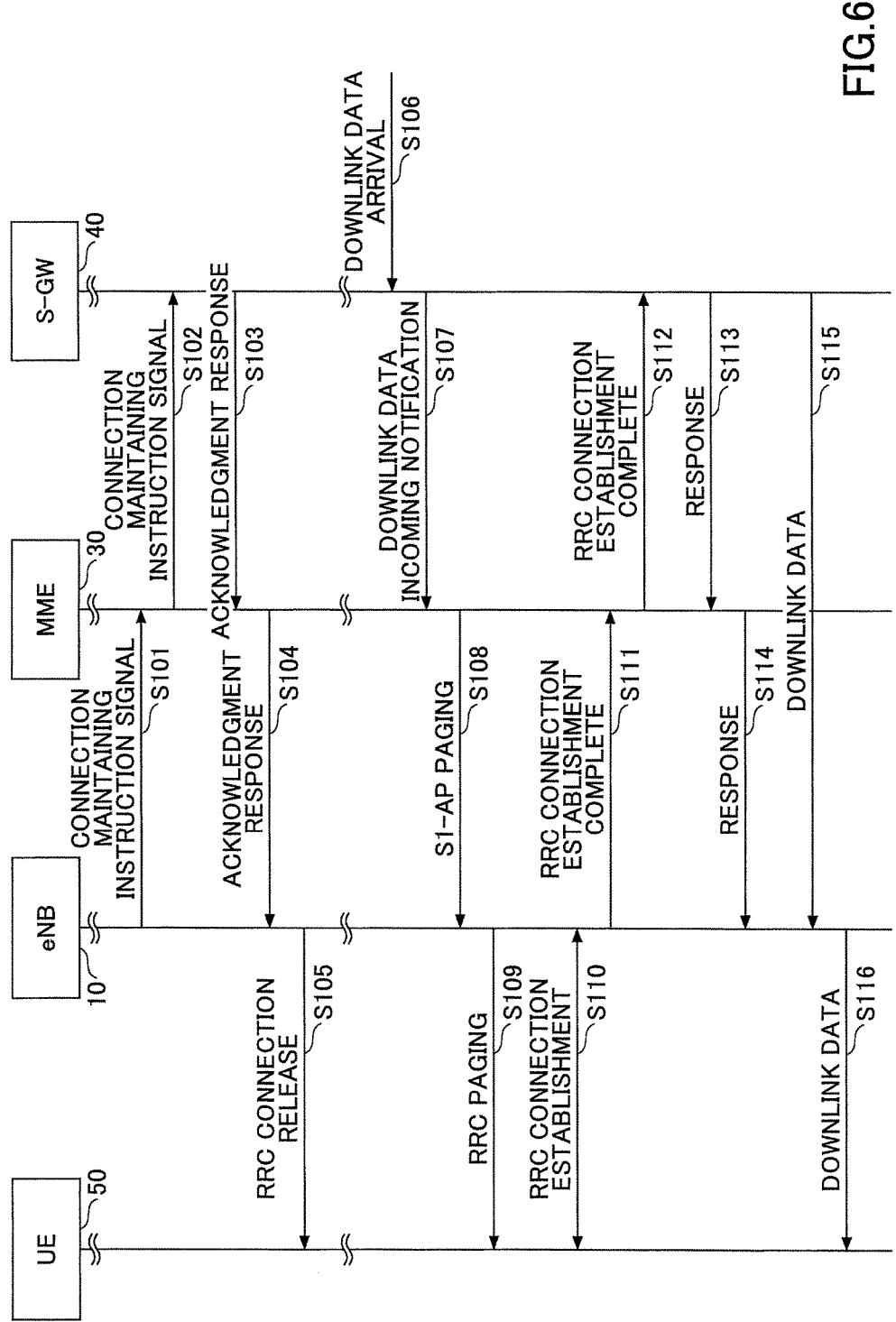
FIG. 6 is a diagram showing a sequence example in a first embodiment.

FIG. 6 is a diagram showing another example of the process sequence. Like the case of the FIG. 5, FIG. 6 is a process sequence in a case where the UE 50 connects to the eNB 10 to enter an RRC connected state, then becomes in an RRC idle state in a cell under the eNB 10, and after that, receives an incoming call in the same cell. However, the sequence of FIG. 6 is different from FIG. 5 in that there are sequences of step 113 and step 114. In the following, points different from FIG. 5 are mainly described.

In this example, by the RRC connection release procedure of step 105, an UE context that was used when RRC connection was established is held in each of the UE 50 and the eNB 10. By the procedure of step 110, the UE 50 becomes an RRC connected state from an RRC idle state. At this time, each of UE contexts held in UE 50 and the eNB 10 enters an activated state from an inactivated state. That is, by the procedure of step 110, each of the UE contexts held in the UE 50 and the eNB 10 is activated.

In step 111, the eNB 10 transmits, to the MME 30, RRC connection establishment complete that is a signal indicating that establishment of an RRC connection has completed. The signal of RRC connection establishment complete may be a signal indicating that the UE context of the UE 50 is activated. The MME 30 transmits the signal of RRC connection establishment complete to the S-GW 40 (step 112).

Then, in the example shown in FIG. 6, in step 113, the S-GW 40 transmits a signal of response for the signal of RRC connection establishment complete to the MME 30. Also, in step 114, the MME 30 transmits a signal of response for the signal of RRC connection establishment complete of step 111 to the eNB 10. The signal of response in step 114 may be a signal of Ack for the signal indicating that the UE context is activated.

After that, like the case of FIG. 5, the S-GW 40 starts transfer of the holding downlink data to the eNB 10 (step 115). The downlink data arrives at the UE 50 from the eNB 10 (step 116).

Accordingly, transmission of downlink data to the UE 50 starts.

<Call Incoming when the UE in an RRC_Idle State Moves to Another eNB>

Next, a process sequence is described with reference to FIG. 7 in a case where the UE 50 connects to the eNB 10 to enter an RRC connected state, then becomes in an RRC idle state in a cell under the eNB 10, and after that, the UE 50 moves to a cell under the eNB 20, and receives an incoming call.

Figure 7:
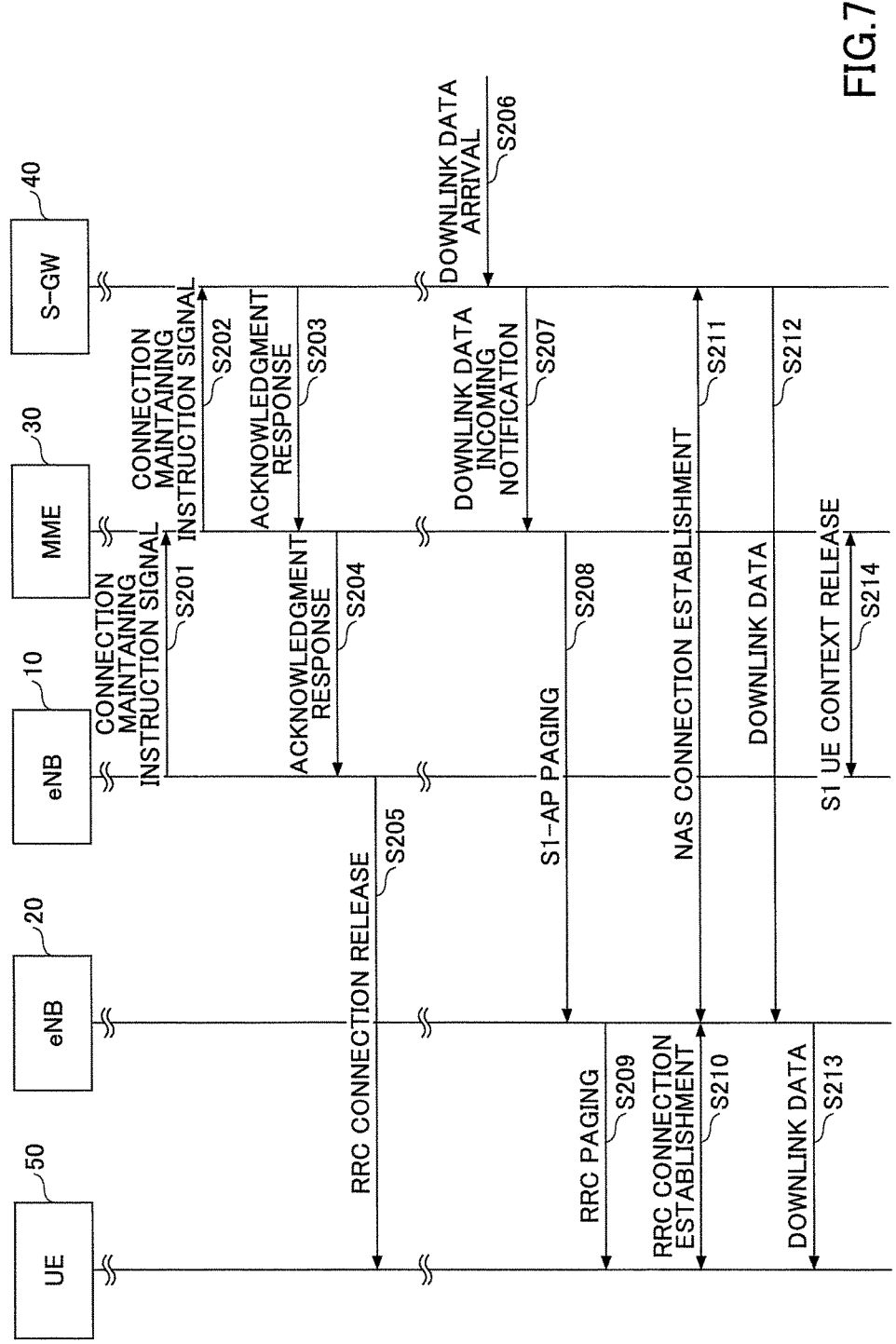
FIG. 7 is a diagram showing a sequence example in a first embodiment.

Also in the case of FIG. 7, as a premise of the processes, it is assumed that the UE 50 is in an RRC connected state in a cell of the eNB 10, and the S1-C/U connection is established.

In the same way as the case of FIG. 5, the eNB 10 transmits a connection maintaining instruction signal to the MME 30 (step 201). Also, the MME 30 transmits the connection maintaining instruction signal to the S-GW 40 (step 202).

As described before, the connection maintaining instruction signal is a signal for instructing to hold downlink data in the S-GW 40 and to perform paging from the MME 30 when there is an incoming call for the UE 50 while maintaining the S1-C/U connection on the UE 50.

The S-GW 40 that receives the connection maintaining instruction signal transmits, to the MME 30, an acknowledgement response (step 203), so that the MME 30 transmits the acknowledgment response to the eNB 10 (step 204).

After steps 201~204, the eNB 10 transmits an RRC Connection Release (RRC Connection Release) to the UE 50 to cause the UE 50 to transit to an RRC idle state (step 205). After that, the UE 50 moves to a cell under the eNB 20.

After that, downlink data for the UE 50 occurs, and the downlink data arrives at the S-GW 40 (step 206). Here, although the S1-U connection has been established, the S-GW 40 holds the downlink data in a buffer without transferring the downlink data to the eNB 10 based on the connection maintaining instruction signal received in step 202.

The S-GW 40 transmits a downlink data incoming notification to the MME 30 (step 207), and the MME 30 transmits, to the eNB 20, a signal of S1-AP paging for the UE 50 (step 208). The paging itself is similar to existing paging. Thus, it is transmitted to each eNB (each of one or a plurality of eNBS) of tracking areas of the UE 50, but FIG. 7 shows transmission to the eNB 20.

The eNB 20 that receives the signal of S1-AP paging transmits a signal of RRC paging to the UE 50 under the eNB 10 (step 209).

The UE 50 that receives the RRC paging signal executes an RRC connection establishment procedure to establish an RRC connection (step 210). Also, a NAS connection procedure is executed between the eNB 20 and the core NW side (S-GW 40 in FIG. 7), so that an S1-C/U connection for the eNB 20 is established (step 211).

According to the above processes, since a connection between the UE 50 and the S-GW 40 is established, the S-GW 40 starts transmission of downlink data to the UE 50 (step 212, S213). Also, the UE context between the eNB 10 and the MME 30 is released, and the S1-C/U connection on the eNB 10 is released (step 214).

Second Embodiment

Next, a second embodiment is described. In the second embodiment, a scheme is described in which paging is performed from the eNB when there is an incoming call for the UE 50 in an RRC idle state.

Here, a process sequence is described with reference to FIG. 8 in a case where the UE 50 connects to the eNB 10 to enter an RRC connected state, then becomes in an RRC idle state in a cell under the eNB 10, and after that, the UE 50 moves to a cell under the eNB 20, and receives an incoming call.

Figure 8:
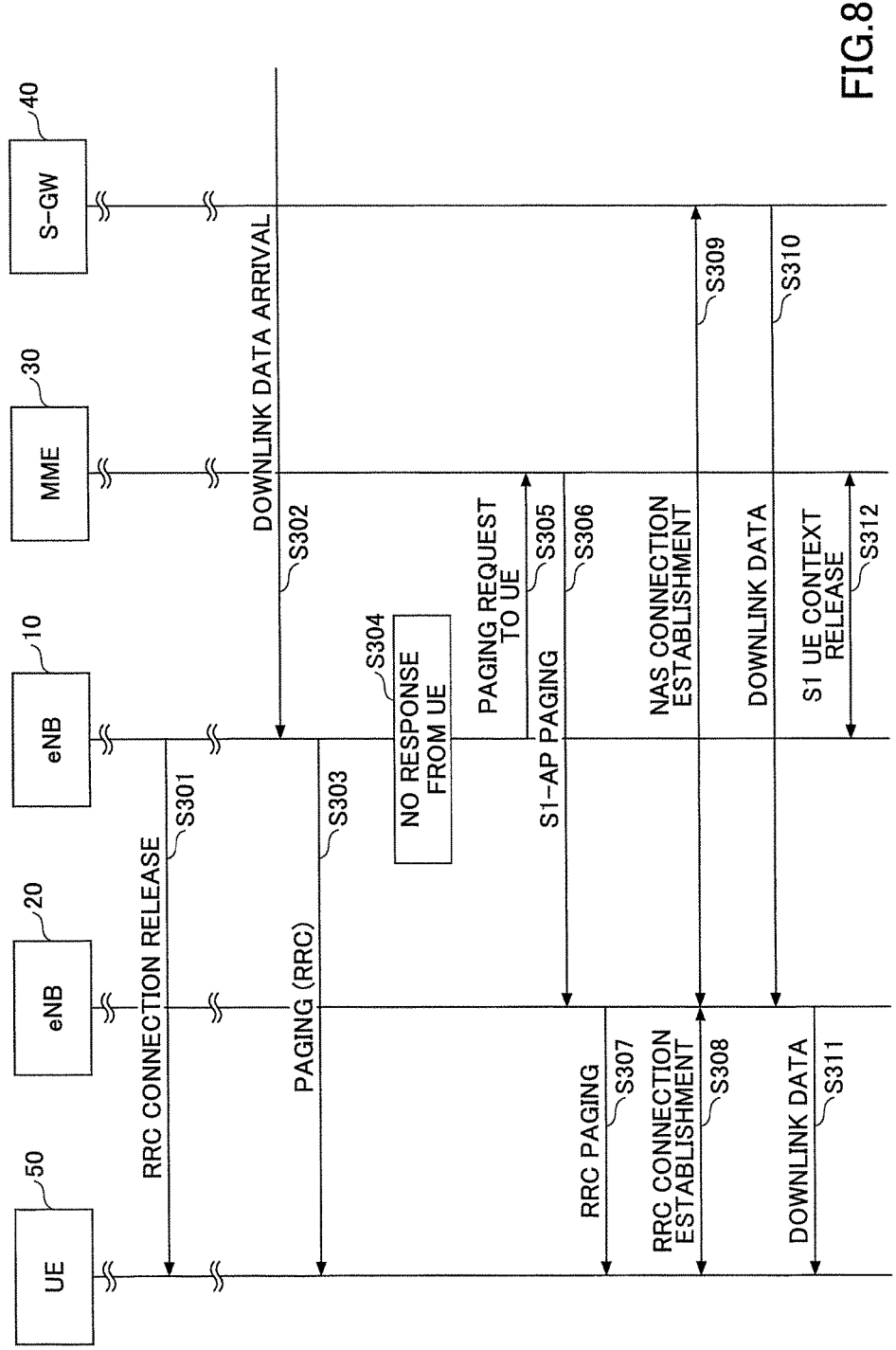
FIG. 8 is a diagram showing a sequence example in a second embodiment.

Also in the case of FIG. 8, as a premise of the processes, it is assumed that the UE 50 is in an RRC connected state in a cell of the eNB 10, and the S1-C/U connection is established.

For example, when an event such as no data communication for a predetermined time occurs for the UE 50, the eNB 10 transmits an RRC Connection Release (RRC Connection Release) to the UE 50 to cause the UE 50 to transit to an RRC idle state (step 301). After that, the UE 50 moves to a cell under the eNB 20.

After that, downlink data for the UE 50 occurs. The downlink data is transferred to the eNB 10 by the already established S1-U connection (step 302). The eNB 10 detects that there is an incoming call addressed to the UE 50 based on arrival of the downlink data, and transmits a signal of RRC paging to the UE 50 (step 303).

However, since the UE 50 is out of coverage of the cell of the eNB 10, the UE 50 does not receive the signal of the paging. For example, when the eNB 10 detects elapse of a predetermined time based on expiration of a predetermined timer after transmitting a signal of RRC paging to the UE 50, the eNB 10 determines that there is no response from the UE 50 (step 304).

When the eNB 10 determines that there is no response from the UE 50, the eNB 10 transmits, to the MME 30, a paging request that is a signal for requesting paging to the UE 50 (step 305). The MME 30 that receives the paging request transmits, to the eNB 20, a signal of S1-AP paging for the UE 50 (step 306). The paging itself is similar to existing paging. Thus, it is transmitted to each eNB (each of one or a plurality of eNBs) of tracking areas of the UE 50, but FIG. 8 shows transmission to the eNB 20.

The eNB 20 that receives the signal of S1-AP paging transmits a signal of RRC paging to the UE 50 under the eNB 20 (step 307).

The UE 50 that receives the RRC paging performs an RRC connection establishment procedure to establish an RRC connection (step 308). Also, a NAS connection procedure is performed between the eNB 20 and the core NW side (S-GW 40 in FIG. 8), so that the S1-C/U connection between the eNB 20 and the core NW for the eNB 20 on the UE 50 is established (step 309).

Accordingly, since a connection between the UE 50 and the S-GW 40 via the eNB 20 is established, the S-GW 40 starts to transmit downlink data to the UE 50 using the connection (steps 310, S311). Also, the UE context between the eNB 10 and the MME 30 is released, and the S1-C/U connection on the eNB 10 is released (step 312).

According to the technique of the first and the second embodiments, in the case where a mechanism is introduced in which a UE context is held limitedly by the same eNB to reduce signaling, an incoming call can be received even when the UE moves to an eNB different from an eNB that holds the UE context.

(Apparatus Configuration Example)

Next, configuration examples of the eNB 10 (having the same configuration as that of eNB 20), the MME 30, and the S-GW 40 are described. The block diagrams are common between the first embodiment and the second embodiment. Configurations of each apparatus described below only show functional units especially related to the embodiment of the present invention, and also include at least functions, not shown in the figure, for operating as an apparatus in a communication system complying with LTE (meaning LTE including EPC). Also, the functional configuration shown in each figure is merely an example. Any functional segmentations and any names of functional units can be used as long as operation of the present embodiment can be executed. For example, in the following, although a communication unit (transmission unit/reception unit) and a control unit are separated, these may be a unified functional unit.

<Configuration Example of eNB>

Figure 9:
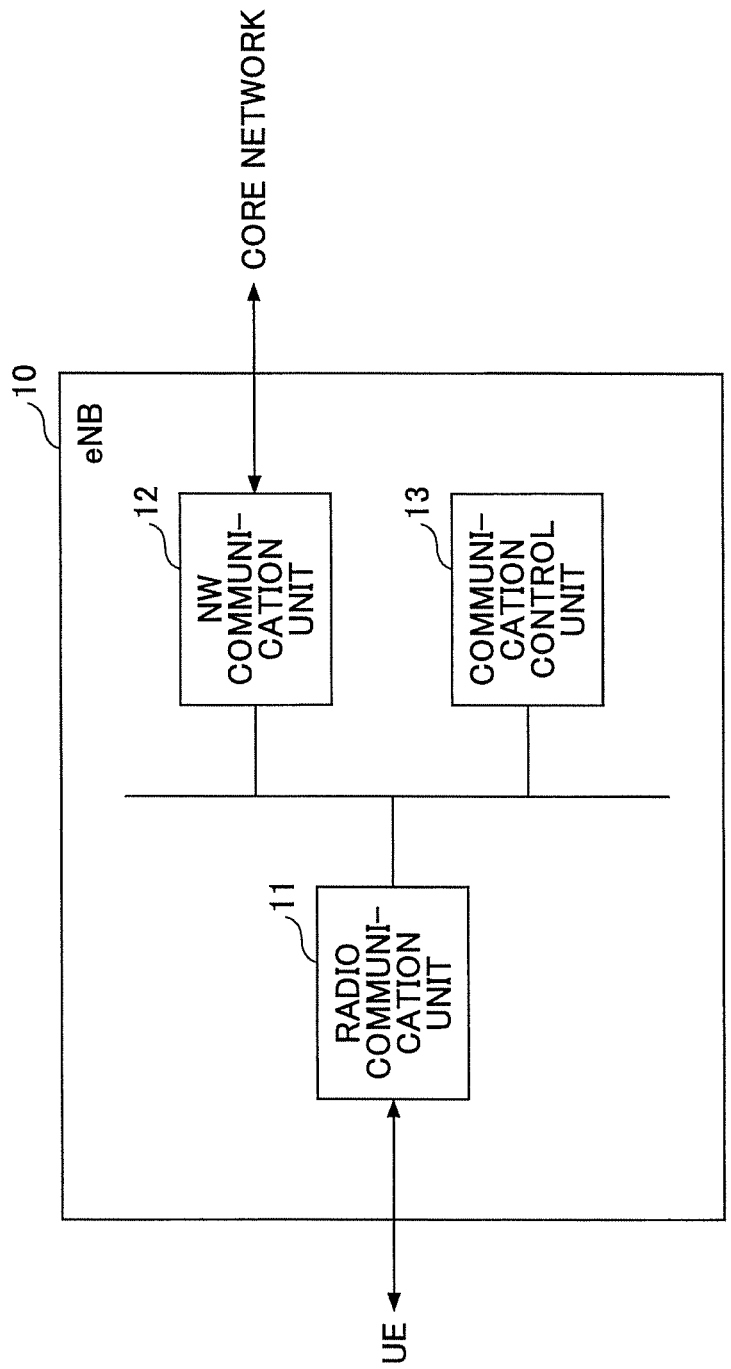
FIG. 9 is a block diagram of a base station.

First, the configuration of the eNB 10 is described with reference to FIG. 9. As shown in FIG. 9, the eNB 10 includes a radio communication unit 11, a NW communication unit 12, and a communication control unit 13.

The radio communication unit 11 is a functional unit configured to perform communication with the UE, and has functions configured to perform communication of control signals and data of physical layer, layer 2 (MAC, RLC, PDCP and the like) and layer 3 (RRC and the like). The radio communication unit 11 also includes a function configured to hold a UE context.

The NW communication unit 12 includes a function configured to transmit and receive control signals with the MME by an S1-MME interface, and a function configured to transmit and receive data with the S-GW by an S1-U interface, and the like.

In the first embodiment, the communication control unit 13 includes a function configured to instruct the NW communication unit 12 to transmit a connection maintaining instruction signal, and a function configured to instruct the NW communication unit 12 to transmit RRC connection establishment complete. Also, the NW communication unit 12 receives a response signal of step 114 of FIG. 6. Also, in the second embodiment, the communication control unit 13 includes a function configured to instruct the NW communication unit 12 to transmit a paging request when detecting that there is no response from the UE for RRC paging.

The eNB 10 may include either the function described in the first embodiment or the function described in the second embodiment, or may include both of the functions.

The configuration of the base station 10 shown in FIG. 9 may be realized by hardware circuits (example: one or a plurality of IC chips) as a whole, or may be realized by hardware circuits for a part and by a CPU and a program for other parts.

Figure 10:
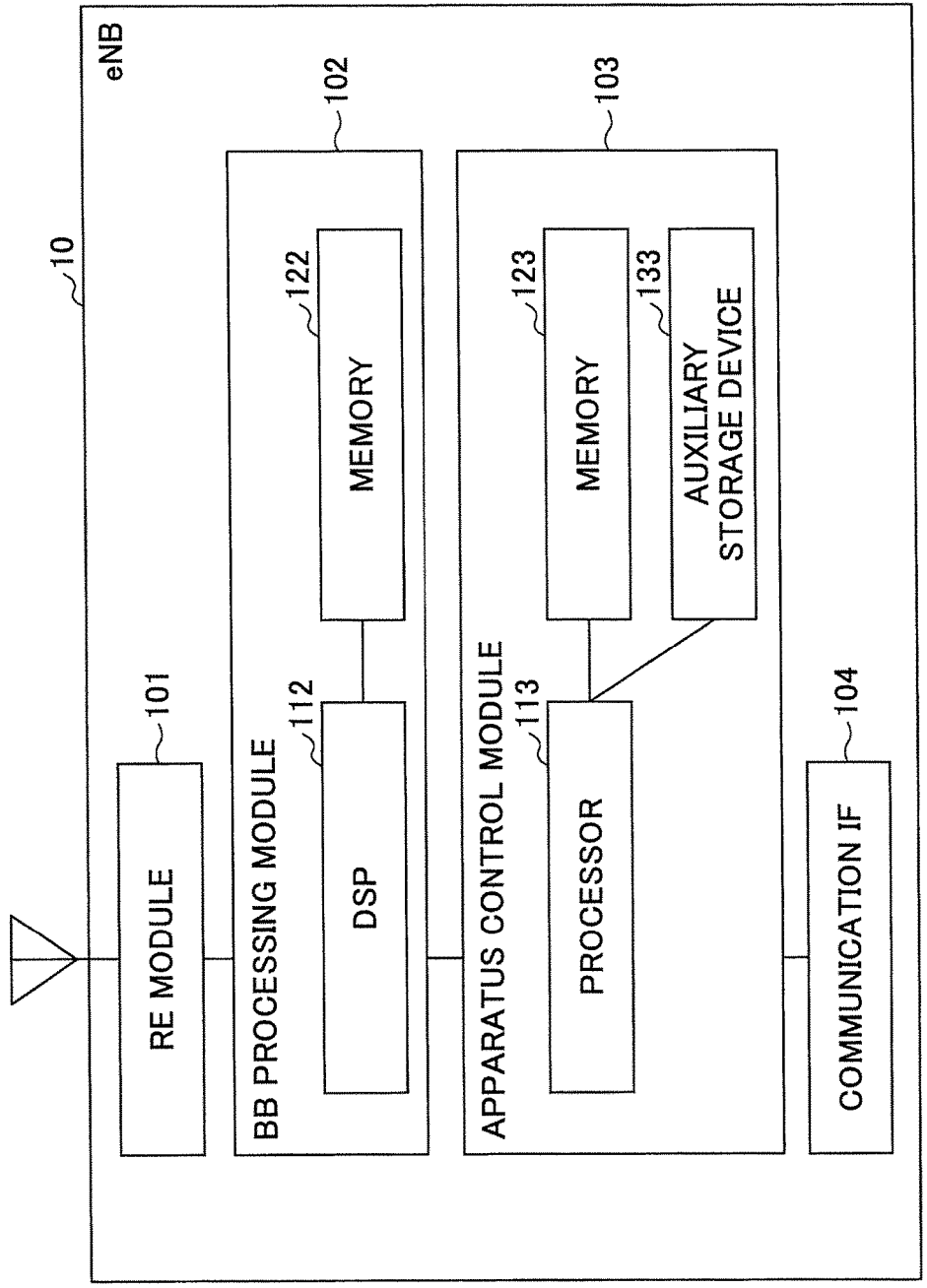
FIG. 10 is a HW block diagram of a base station.

FIG. 10 is a diagram showing an example of a hardware (HW) configuration of the base station 10. FIG. 10 shows a configuration closer to an implementation example than FIG. 9. As shown in FIG. 10, the base station 10 includes an RE module 101 for performing processing on radio signals, a BB processing module 102 for performing baseband signal processing, an apparatus control module 103 for performing processes of upper layer and the like, and a communication IF 104 that is an interface for connecting to a network.

The RE module 101 generates a radio signal that should be transmitted from an antenna by performing D/A conversion, modulation, frequency conversion, and power amplifying and the like on a digital baseband signal received from the BB processing module 102. Also, the RE module 101 generates a digital baseband signal by performing frequency conversion, A/D conversion, demodulation and the like on a received radio signal, so as to pass the signal to the BB processing module 102. The RE module 101 includes, for example, functions of physical layer of the radio communication unit 11 of FIG. 9.

The BB processing module 102 performs processing for converting between IP packets and digital baseband signals. The DSP 112 is a processor for performing signal processing in the BB processing module 102. The memory 122 is used as a work area of the DSP 112. The BB processing module 102 may include, for example, functions of layer 2 and the like of the radio communication unit 11 of FIG. 9, and the RRC processing unit 203 and the communication control unit 13. All of or a part of functions of the communication control unit 13 may be included in the apparatus control module 103.

The apparatus control module 103 performs protocol processing of IP layer, OAM processing, and the like. The processor 113 is a processor for performing processes performed by the apparatus control module 103. The memory 123 is used as a work area of the processor 113. The auxiliary storage device 133 is, for example, an HDD and the like, and stores various setting information and the like for operation of the base station 10. The communication interface 104 corresponds to the NW communication unit 12 of FIG. 9.

<Configuration Examples of MME and S-GW>

Figure 11:
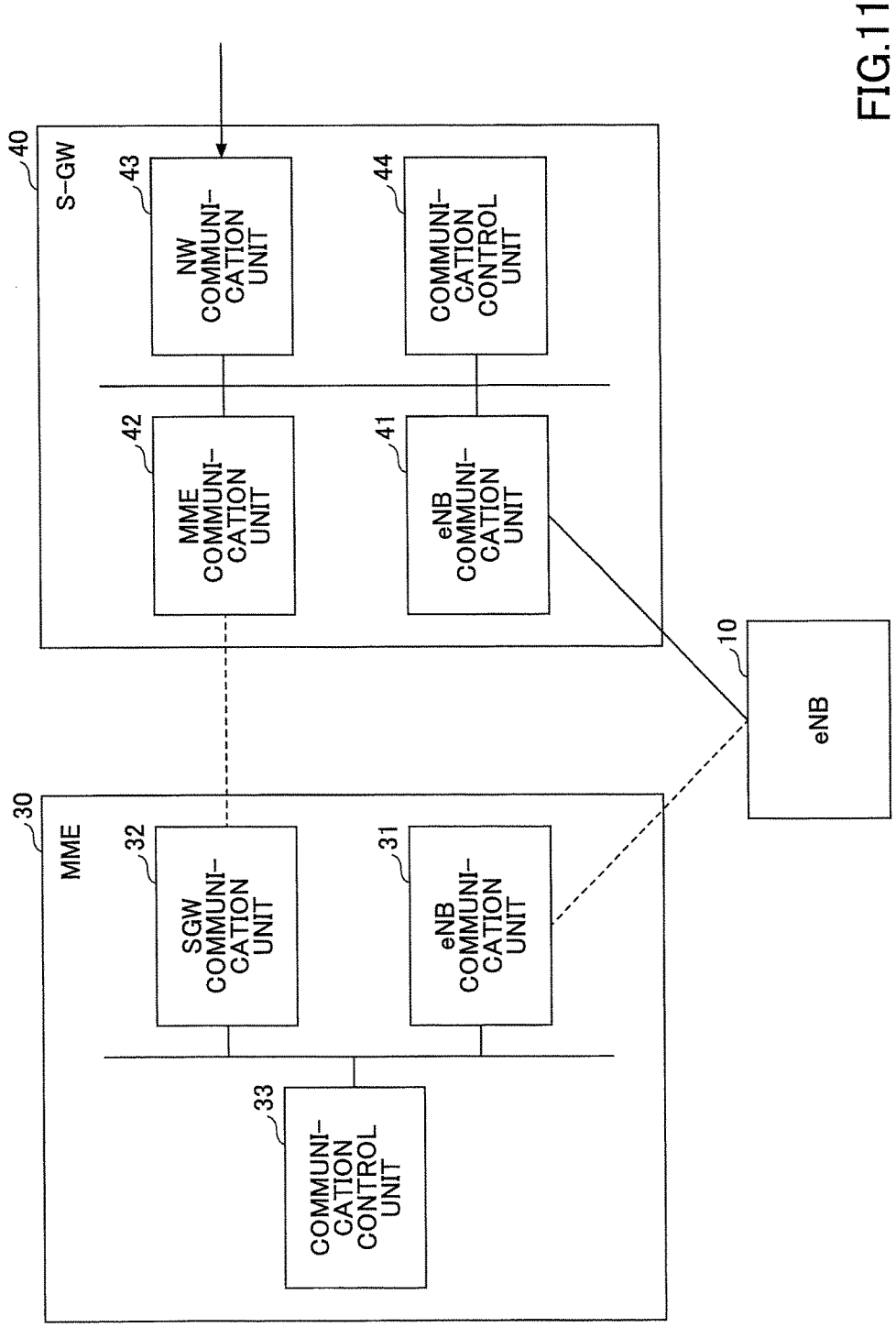
FIG. 11 is a block diagram of an MME and an S-GW.

Next, configuration examples of the MME 30 and the S-GW 40 are described with reference to FIG. 11. As shown in FIG. 11, the MME 30 includes an eNB communication unit 31, an SGW communication unit 32, and a communication control unit 33.

The eNB communication unit 31 includes a function configured to perform transmission and reception of control signals with the eNB by the S1-MME interface. The SGW communication unit 32 includes a function configured to perform transmission and reception of control signals with the S-GW by the S11 interface.

In the first embodiment, the communication control unit 33 includes functions configured to instruct the SGW communication unit 32 to transmit a connection maintaining instruction signal to the S-GW when receiving the connection maintaining instruction signal from the eNB, and to instruct the SGW communication unit 32 to transmit an acknowledgement response to the eNB when receiving the acknowledgement response from the S-GW. Also, the SGW communication unit 32 receives the response signal of step 113 of FIG. 6, and the eNB communication unit transmits a response signal of step 114 of FIG. 6. Also, in the second embodiment, the communication control unit 33 includes a function configured to instruct the eNB communication unit 31 to transmit S1-AP paging to the UE when receiving a paging request for the UE from the eNB.

The MME 30 may include either the function described in the first embodiment or the function described in the second embodiment, or may include both of the functions.

As shown in FIG. 11, the S-GW 40 includes an eNB communication unit 41, an MME communication unit 42, a NW communication unit 43 and a communication control unit 44.

The eNB communication unit 41 includes a function configured to perform transmission and reception of data with the eNB by the S1-U interface. The MME communication unit 42 includes a function configured to perform transmission and reception of control signals with the S-GW by the S11 interface. The NW communication unit 43 includes a function configured to perform transmission and reception of control signals and transmission and reception of data with a node apparatus in the core NW side.

In the first embodiment, the communication control unit 44 includes a function configured to instruct the MME communication unit 42 to transmit an acknowledge response to the MME when receiving a connection maintaining instruction signal from the MME. Also, in the first embodiment, the communication control unit 44 includes functions configured, when it has received connection maintaining instruction signal from the MME, to instruct the NW communication unit 43 to hold downlink data in a buffer when receiving downlink data for the UE, and to instruct the NW communication unit 43 to transmit downlink data when receiving RRC connection establishment complete from the eNB. Also, the MME communication unit 42 transmits a response signal of step 113 of FIG. 6. In the second embodiment, the S-GW 40 can be realized by using existing functions.

The MME 30 and the S-GW 40 can be configured as one apparatus. In that case, communication of S11-interface between the SGW communication unit 32 and the MME communication unit 42 becomes communication within the apparatus.

Each of the MME 30, the S-GW 40, and an apparatus including the MME 30 and the S-GW 40 can be realized by using, for example, a computer that includes a CPU and a memory and that is realized by a program being executed by the CPU (processor), for example.

Figure 12:
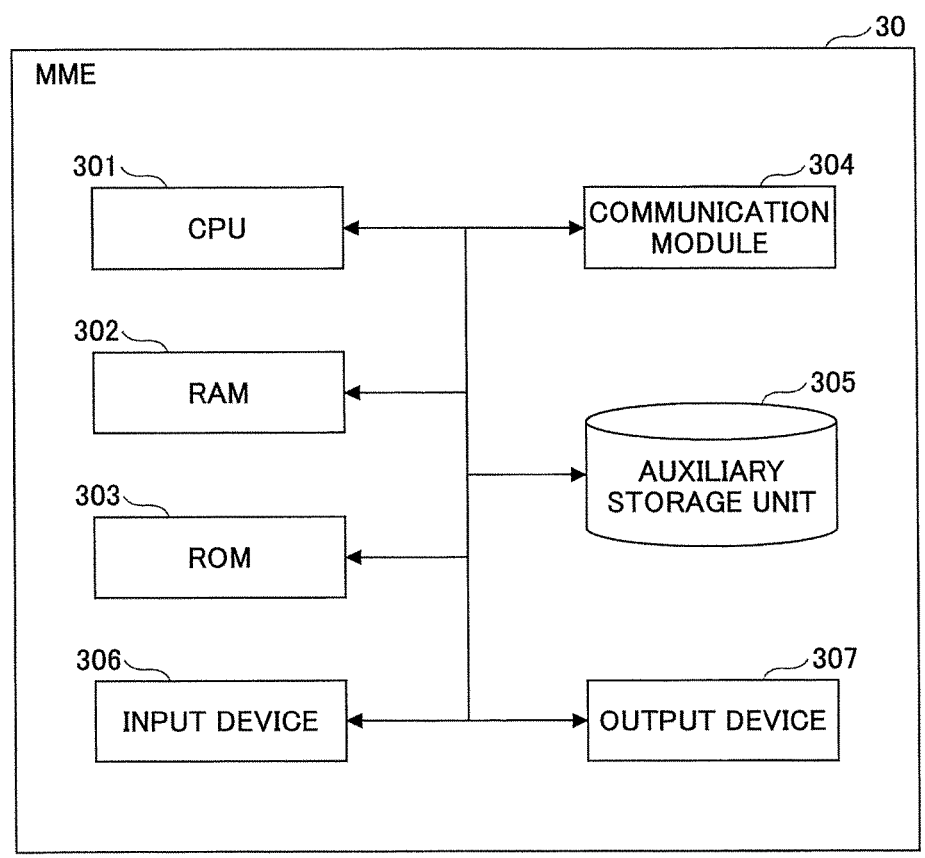
FIG. 12 is a HW block diagram of an MME.

FIG. 12 shows an example of a hardware (HW) configuration of the MME 30 in the case where the MME 30 is configured by the above-mentioned computer. The same configuration can be also used for the S-GW 40, and the apparatus including the MME 30 and the S-GW 40.

As shown in FIG. 12, the MME 30 includes a CPU 301, a RAM (Random Access Memory) 302, a ROM (Read Only Memory) 303, a communication module 304 for performing communication, an auxiliary storage device 305 such as a hard disk and the like, an input device 306 and an output device 307.

The CPU 301 reads out and executes a program stored in storage means such as the RAM 302, the ROM 303, the auxiliary storage device 305 and the like, so that operation of each function of the MME 30 is executed. Also, for processing in which network communication is performed, the communication module 304 is used. Also, for example, input of configuration information for the MME 30 is performed by the input device 306, and for example, output of operating state of the MME 30 and the like can be performed by the output device 307.

(Process Flow Example)

Figure 13:
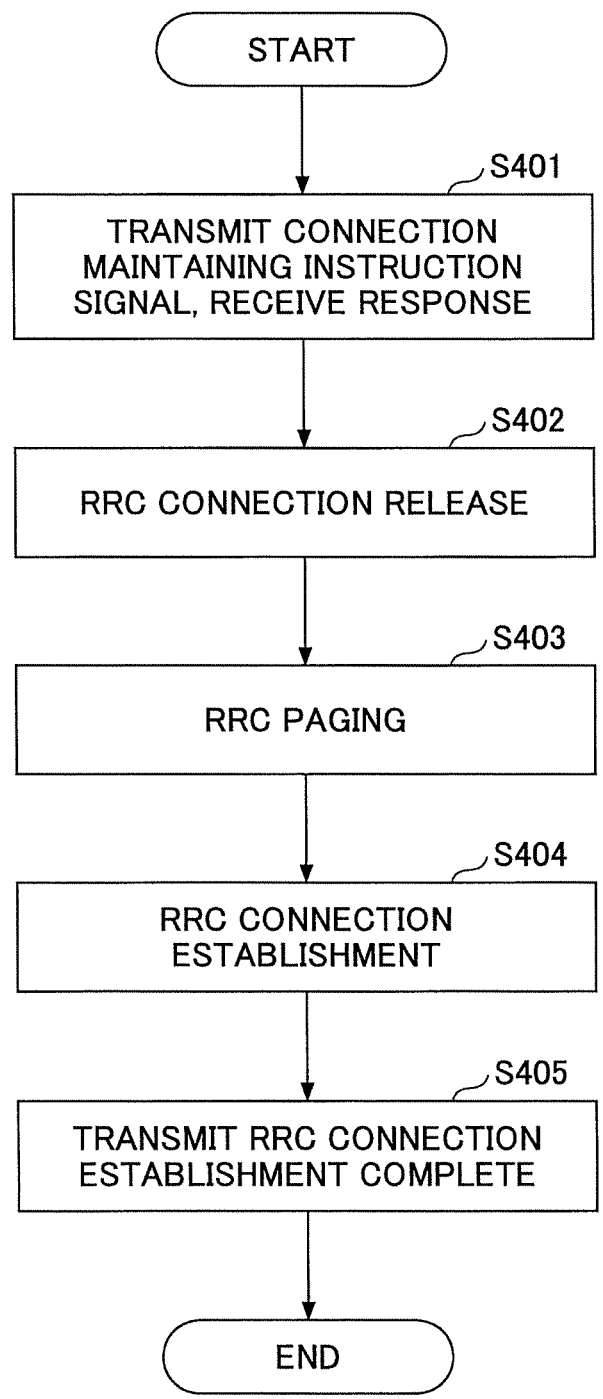
FIG. 13 is a flowchart indicating an operation example 1 of the base station.

As an operation example 1 of the base station having the above-mentioned configuration, a process flow of the eNB 10 is described with reference to FIG. 13 in the case where, in the first embodiment, the UE 50 enters an RRC idle state in a cell under the eNB 10, and after that, the UE 50 receives an incoming call (the case of FIG. 5 and FIG. 6).

In a state in which the UE 50 is in an RRC connected state in the cell of the eNB 10 and the S1-C/U connection is established, when the radio communication unit 11 of the eNB 10 detects a trigger for causing the UE 50 to enter the RRC idle state, the NW communication unit 12 transmits a connection maintaining instruction signal to the MME 30 based on an instruction of the communication control unit 13, and the NW communication unit 12 receives an acknowledgement response from the MME 30 (step 401). After receiving the acknowledgment response, based on an instruction of the communication control unit 13, the radio communication unit 11 transmits RRC connection release to the UE 50 to make the UE 50 be in an RRC idle state (step 402).

After that, when the NW communication unit 12 receives a signal of S1-AP paging from the MME 30, the radio communication unit 11 transmits a signal of RRC paging to the UE 50 (step 403). When an RRC connection is established between the UE 50 and the eNB 10 (step 404), the NW communication unit 12 transmits a signal of RRC connection establishment complete to the MME 30 based on an instruction of the communication control unit 13 (step 405). Also, in the case of FIG. 6, the NW communication unit 12 receives a response for the signal of RRC connection establishment complete from the MME 30.

Figure 14:
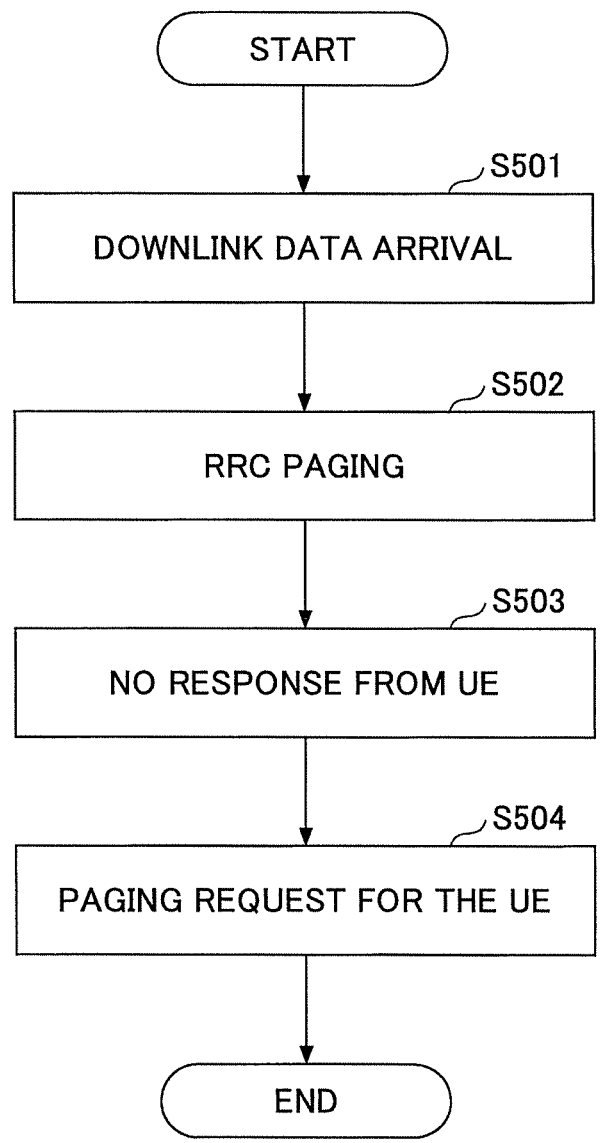
FIG. 14 is a flowchart indicating an operation example 2 of the base station.

As an operation example 2 of the base station having the above-mentioned configuration, a process flow of the eNB 10 is described with reference to FIG. 14 in the case where, in the second embodiment, the UE 50 connected to the eNB 10 to enter an RRC connected state, and enters an RRC idle state in a cell under the eNB 10, and after that, the UE 50 moves to a cell under the eNB 20, and receives an incoming call (the case of FIG. 8).

In a state in which the UE 50 is in an RRC connected state in the cell of the eNB 10 and the S1-C/U connection is established, when the NW communication unit 12 of the eNB 10 detects incoming call to the UE 50 by receiving downlink data (step 501), the radio communication unit 11 transmits a signal of RRC paging to the UE 50 based on an instruction of the communication control unit 13 (step 502).

When the radio communication unit 11 detects that there is no response from the UE 50 for the paging (step 503), the NW communication unit 12 transmits a paging request for the UE 50 to the MME 30 based on an instruction from the communication control unit 13 (step 504).

Next, as an operation example of the MME and the S-GW having the above-mentioned configuration, a process flow is described with reference to FIG. 15 in the case where, in the first embodiment, the UE 50 enters an RRC idle state in a cell under the eNB 10, and after that, the UE 50 receives an incoming call (the case of FIG. 5 and FIG. 6).

When the eNB communication unit 31 of the MME 30 receives a connection maintaining instruction signal transmitted from the eNB 10, the connection maintaining instruction signal is transmitted by the SGW communication unit 32 to the S-GW 40, so that the MME communication unit 42 of the S-GW 40 receives it (step 601).

After an acknowledgement response is returned, when the NW communication unit 43 of the S-GW 40 receives downlink data to the UE 50, the NW communication unit 43 holds the data in a buffer based on an instruction of the communication control unit 44 (step 602). Also, a downlink data incoming notification is transmitted to the MME 30, and the MME 30 transmits, to the eNB 10, a signal of S1-AP paging for the UE 50 by the eNB communication unit 31 (step 603).

After an RRC connection is established based on the paging, the eNB communication unit 31 of the MME 30 receives an RRC connection establishment complete from the eNB 10, and further, the RRC connection establishment complete is transferred to the S-GW 40, so that the MME communication unit 42 receives the RRC connection establishment complete (step 604). Also, in the case of FIG. 6, the MME communication unit 42 transmits, to the MME 30, a response for the RRC connection establishment complete, and the eNB communication unit 31 of the MME 30 transmits, to the eNB 10, a response for the RRC connection establishment complete from the eNB 10. Then, transmission of downlink data addressed to the UE 50 starts from the eNB communication unit 41 to the eNB (step 605).

As described above, according to the present embodiment, there is provided a paging control method in a mobile communication system including a base station and a communication control apparatus, including:

an instruction step in which, in a state where a connection between the base station and the communication control apparatus is established, the base station transmits a connection maintaining instruction signal to the communication control apparatus; and a paging step in which, when the communication control apparatus that receives the connection maintaining instruction signal receives downlink data for the user apparatus, the communication control apparatus holds the downlink data in a buffer and transmits a paging signal for the user apparatus while maintaining the connection between the base station and the communication control apparatus.

According to this configuration, in a mobile communication system including a base station and a communication control apparatus, it becomes possible to properly perform call incoming for a user apparatus while reducing the number of signalings.

The paging control method may further includes a data transmission step in which the communication control apparatus starts transmission of the downlink data when the communication control apparatus receives, from the base station, a connection establishment complete signal indicating that a connection between the user apparatus and the base station has been established. According to this configuration, the communication control apparatus can start transmission of held downlink data at a proper timing. Note that the timing to start transmission of downlink data is not limited to this.

In the instruction step, the base station may transmit the connection maintaining instruction signal to the communication control apparatus, and after receiving an acknowledgement response from the communication control apparatus, the base station may cause the user apparatus connected to the base station to transit to an idle state. In this configuration, since the connection maintaining instruction signal is transmitted before making the user apparatus be in an idle state, it becomes possible to properly preform control such as holding of downlink data when downlink data for a user apparatus in an idle state arrives.

Also, according to the present embodiment, there is provided a paging control method in a mobile communication system including a base station and a communication control apparatus, including:

a first paging step in which, in a state in which a connection between the base station and the communication control apparatus is established, when the base station receives downlink data for a user apparatus from the communication control apparatus, the base station transmits a paging signal for the user apparatus; and a request step in which, when the base station detects that there is no response for the paging signal from the user apparatus, the base station requests the communication control apparatus to transmit a paging signal for the user apparatus.

According to this configuration, in a mobile communication system including a base station and a communication control apparatus, it becomes possible to properly perform call incoming for a user apparatus while reducing the number of signalings.

The paging control method may further includes a second paging step in which, the communication control apparatus that receives the request in the request step transmits a paging signal for the user apparatus to one or a plurality of base stations including the base station to which the user apparatus is connected. By executing the second paging step as mentioned above as an example of operation for the request, for example, call incoming to a user apparatus that has moved from a cell of an initially connected base station can be properly performed.

The communication control apparatus can be configured as a system that includes an MME and an S-GW, for example. Accordingly, a paging control method can be provided that is especially suitable for an LTE system including an MME and an S-GW.

Also, according to the present embodiment, there is provided a communication control apparatus in a mobile communication system including a base station and a communication control apparatus, including:

reception means configured, in a state where a connection between the base station and the communication control apparatus is established, to receive a connection maintaining instruction signal from the base station; and control means configured, when receiving downlink data for a user apparatus after receiving the connection maintaining instruction signal, to hold the downlink data in a buffer and transmit a paging signal to the user apparatus while maintaining the connection between the base station and the communication control apparatus.

According to this configuration, there is provided a technique, in a mobile communication system including a base station and a communication control apparatus, to make it possible to properly perform call incoming for a user apparatus while reducing the number of signalings.

The control means may start transmission of the downlink data when receiving, from the base station, a connection establishment complete signal indicating that a connection between the user apparatus and the base station have been established. According to this configuration, the communication control apparatus can start transmission of held downlink data at a proper timing. Note that the timing to start transmission of downlink data is not limited to this.

Also, according to the present embodiment, there is provided a base station in a mobile communication system including the base station and a communication control apparatus, including:

transmission means configured, in a state in which a connection between the base station and the communication control apparatus is established, to transmit a paging signal for a user apparatus when receiving downlink data for the user apparatus from the communication control apparatus; and control means configured, when detecting that there is no response for the paging signal from the user apparatus, to request the communication control apparatus to transmit a paging signal for the user apparatus. According to this configuration, there is provided a technique, in a mobile communication system including a base station and a communication control apparatus, to make it possible to properly perform call incoming for a user apparatus while reducing the number of signalings. "Means" in the above-mentioned configuration of each apparatus may be replaced with "unit".

Each of the eNB, the MME and the S-GW described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the case where the function of the MME and the function of the S-GW are included in one apparatus, the apparatus may include a CPU and a memory and may be realized by executing a program by the CPU (processor), or may be realized by hardware such as hardware circuits including logics of processing described in the present embodiment, or may be configured by coexistence of a program and hardware.

In the above, the embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, each apparatus has been explained by using functional block diagrams. However, such an apparatus may be implemented in hardware, software, or a combination thereof.

The software operating by a processor provided in the apparatus according to the embodiments of the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2015-010451, filed in the JPO on Jan. 22, 2015, and the entire contents of the Japanese patent application No. 2015-010451 are incorporated herein by reference.

DESCRIPTION OF REFERENCE SIGNS 10, 20 eNB
30 MME
50 UE
11 radio communication unit
12 NW communication unit
13 communication control unit
31 eNB communication unit
32 SGW communication unit
33 communication control unit
41 eNB communication unit
42 MME communication unit
43 NW communication unit
44 communication control unit
101 RE module
102 BB processing module
103 apparatus control module
104 communication IF
301 CPU
302 RAM
303 ROM
304 communication module
305 auxiliary storage device
306 input device
307 output device

The invention claimed is:

1. A paging control method in a mobile communication system including a base station and a communication control apparatus, comprising:
transmitting, from the base station to the communication control apparatus, a connection maintaining instruction signal while a connection between the base station and the communication control apparatus is established; and
when the communication control apparatus that receives the connection maintaining instruction signal receives downlink data for a user apparatus, holding, with the communication control apparatus, the downlink data in a buffer and transmitting, from the communication control apparatus, a paging signal for the user apparatus while maintaining the connection.

2. The paging control method as claimed in claim 1, further comprising:
transmitting, from the communication control apparatus to the user apparatus, the downlink data based on the communication control apparatus receiving a connection establishment complete signal from the base station,
wherein the connection establishment complete signal indicates that a connection between the user apparatus and the base station has been established.

3. The paging control method as claimed in claim 1, further comprising:
receiving, with the base station, an acknowledgement response from the communication control apparatus in response to the connection maintaining instruction signal; and
causing, with the base station, the user apparatus connected to the base station to transit to an idle state.

4. The paging control method as claimed in claim 1, wherein the communication control apparatus includes a Mobility Management Entity (MME) and a Serving Gateway (S-GW).

5. The paging control method as claimed in claim 2, further comprising:
   receiving, with the base station, an acknowledgement response from the communication control apparatus in response to the connection maintaining instruction signal; and
   causing, with the base station, the user apparatus connected to the base station to transit to an idle state.

6. The paging control method as claimed in claim 2, wherein the communication control apparatus includes an MME and an S-GW.

7. The paging control method as claimed in claim 3, wherein the communication control apparatus includes an MME and an S-GW.

8. A communication control apparatus in a mobile communication system including a base station and the communication control apparatus, comprising:
   a receiver that receives a connection maintaining instruction signal from the base station while a connection between the base station and the communication control apparatus is established; and
   a processor that causes a buffer to hold downlink data for a user apparatus while maintaining the connection, when the receiver receives the downlink data after the receiver receives the connection maintaining instruction signal; and
   a transmitter that transmits a paging signal to the user apparatus while maintaining the connection.

9. The communication control apparatus as claimed in claim 8,
   wherein the receiver receives a connection establishment complete signal from the base station,
   wherein the transmitter transmits based on the reception of the connection establishment complete signal, and
   wherein the connection establishment complete signal indicates that a connection between the user apparatus and the base station has been established.

* * * * *